Patented Apr. 30, 1929.

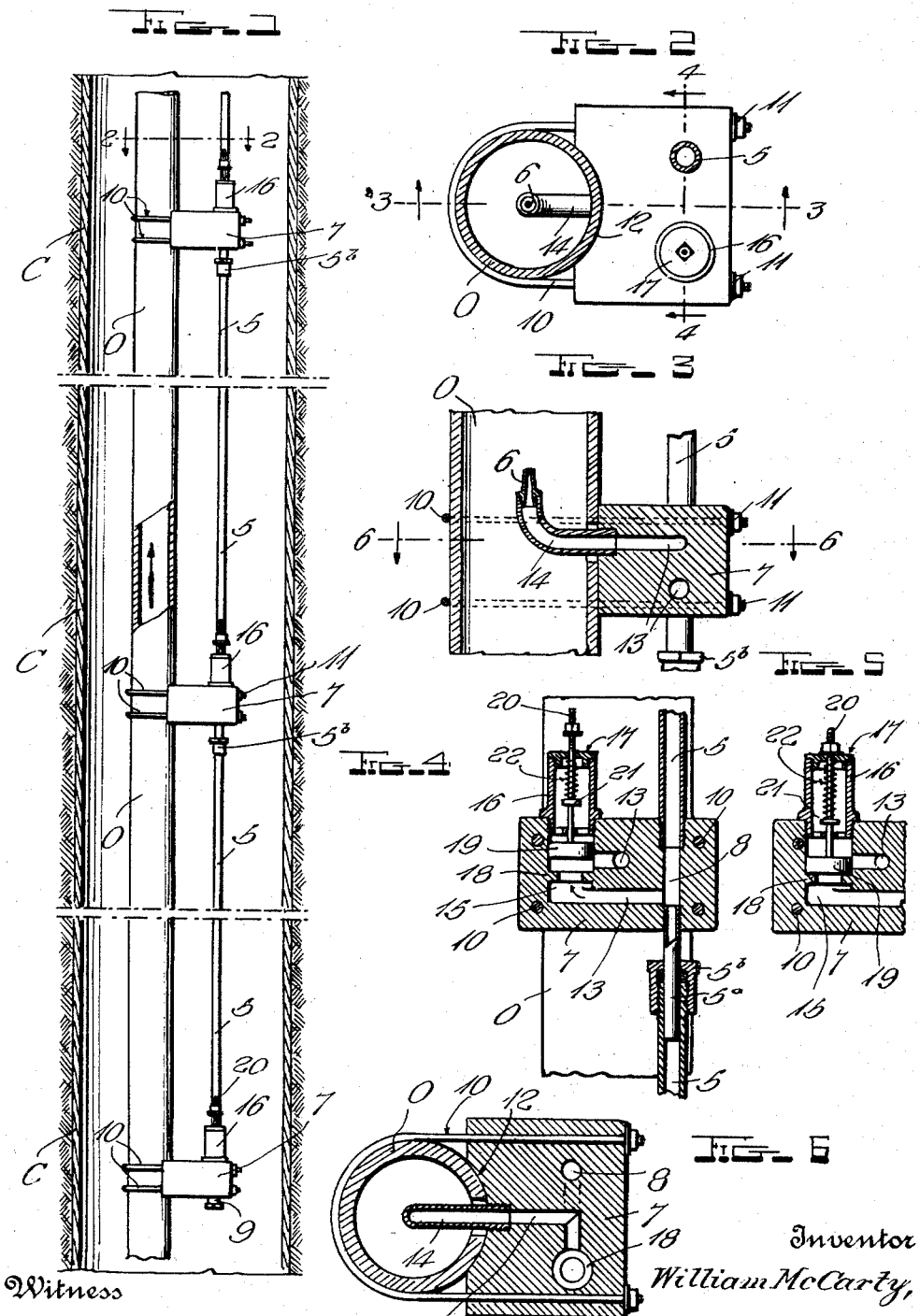

1,710,937

UNITED STATES PATENT OFFICE.

WILLIAM McCARTY, OF ALHAMBRA, TEXAS.

PRESSURE LIFT FOR OIL WELLS.

Application filed May 12, 1928. Serial No. 277,260.

This invention relates to improvements in pressure lifts for oil wells.

One object of the invention is to provide means whereby gas pressure may be distributed and injected at proper intervals into the oil pipe line of the oil well for successively lifting the oil therein from one injecting mechanism to the next.

Another object is to provide an improved construction and arrangement of air or gas injecting mechanism including an automatically operating valve for closing the air passage to the oil pipe thereby preventing oil from entering the air pressure line if for any reason the air pressure decreases.

With the foregoing in view the invention resides in the novel subject matter hereinafter described and claimed, the description being supplemented by the accompanying drawing.

Figure 1 is a vertical sectional view through a portion of an oil well casing showing the improved pressure lift applied to the oil pipe line of the well, parts of the latter being broken away and in section.

Fig. 2 is a horizontal sectional view taken on the line 2—2 of Fig. 1 but showing the parts on a larger scale.

Fig. 3 is a vertical sectional view taken on the line 3—3 of Fig. 2.

Fig. 4 is a similar view taken on the line 4—4 of Fig. 2.

Fig. 5 is a view similar to Fig. 4 showing the valve in closed position.

Fig. 6 is a horizontal sectional view taken on the line 6—6 of Fig. 3.

In the drawings above briefly described, the preferred form of construction has been illustrated and while this construction will be specifically described, it is to be understood that within the scope of the invention as claimed variations may be made.

In the drawing C denotes an oil well casing in which is arranged the oil pipe O. Extending down into the casing C parallel to the oil pipe O and spaced a suitable distance therefrom is a conducting pipe 5 which is considerably smaller than the oil pipe. Disposed at suitable intervals in the air conducting pipe and connected with the oil pipe are air injecting devices 6, by means of which air under pressure is injected into the oil pipe for lifting the oil therein from one injecting device to the next one above. These air injecting devices being preferably spaced about sixty feet apart in the air pipe.

Each of the injecting devices comprises a rectangular block 7 having therein at one side of its center a vertical air passage 8 which extends entirely through the block from top to bottom. The upper end of this passage 8 is threaded and into these threaded ends are screwed the lower ends of the sections of the air conducting pipe 5. The lower ends of the passage 8 of the blocks is reduced to the size of the inner diameter of the adjacent end of the air conducting pipe 5, said end of the pipe being spaced a short distance below the block. Threaded into or otherwise tightly engaging the reduced lower end of the passage 8 is a short nipple 5ª the outside diameter of which corresponds with the inside diameter of the adjacent spaced end of the pipe 5 with which the projecting end of the nipple is slidably engaged.

On the end of the pipe 5 is screwed a packing gland 5ᵇ through which the nipple passes, said gland forming a fluid tight connection between the nipple and the end of the pipe. This slip joint connection between the nipple 5ª and the pipe 5 compensates for any expansion of the sections of the air pipe line if it should be desired to use heated liquid in this pipe line. By connecting the ends of the air pipe sections with the passage 8 in the blocks as indicated a continuous passage is formed from the top to the bottom of the air line. Into the threaded lower end of the passage 8 of the lower-most block 7 is screwed a plug 9 which closes the lower end of the air line.

The blocks 7 are clamped to the oil pipe by U bolts 10 the ends of which pass through openings in the blocks and receive clamping nuts 11 as shown. The sides of the blocks which engage the oil pipe are preferably hollowed out as shown at 12 to receive the side of the oil pipe.

In the block 7 is formed a by-pass 13 one end of which communicates with the vertical air passage 8 and the other end of which opens through the side of the block which engages said oil pipe and with this end of the by-pass is connected one end of an air injecting nipple 14 which projects into the oil pipe as more clearly shown in Fig. 3 of the drawing. In the block 7 is also formed a valve chamber 15 which bisects or forms part of the by-pass as shown in Fig. 4. The upper end of the valve chamber opens through the upper side of the block 7 and into said open upper end of the valve chamber is screwed or otherwise secured the lower end of a tubular valve stem housing 16 which projects upwardly from the block and is closed at its upper end by a removable cap 17.

In the valve chamber between the ends of the by-pass sections which connect with the valve chamber, is a valve seat 18 with which is adapted to be engaged a valve 19 whereby the by-pass may be closed to prevent oil from the oil pipe passing therethrough and entering the air line. The valve 19 is provided with a guide stem 20 which extends upwardly and passes through a guide member at the lower end of the housing 16 and through the cap 17 on the upper end thereof. On the valve stem is a fixed disc 21 between which and the cap 17 is arranged a coiled spring 22 the pressure of which tends to close the valve, when the pressure of the air from the air conducting pipe decreases and becomes less than the pressure of the spring and which decrease in the air pressure would allow oil from the oil pipe to enter the by-pass through the injecting nipple 14 and find its way into the air line. The upper end of the valve stem is threaded and has arranged thereon a valve adjusting nut.

While in the foregoing and in the following claims I have referred to the pressure as being compressed air, it will be understood that gas under pressure may be used as the lifting medium for the oil or other liquid and that the invention may be used for lifting water or other liquids as well as oil.

I claim:

1. In a pressure lifting means for oil pipes, an air conducting pipe, an air injecting device interposed in said air conducting pipe, said device comprising a block having an air passage extending therethrough and with which the sections of said air pipe are connected, a by-pass connected at one end with said air passage and opening at its other end through one side of the block, an air injecting nipple connected with said open end of the by-pass and adapted to project into said oil pipe, a valve chamber in the block forming a part of said by-pass, a valve seat in said chamber between the connections of the by-pass therewith, a valve slidably mounted in said valve chamber for engagement with said seat whereby said by-pass is closed, said valve having a guide stem, a valve stem housing connected with said valve chamber to slidably receive said valve stem, a cap on said housing through which said valve stem works, a spring engaged with said valve stem in said housing, the pressure of said spring being exerted to close said valve against said seat when the air pressure in said air conducting pipe becomes less than the pressure of the spring and an adjusting nut on said valve stem.

2. In a pressure lifting means, an oil pipe, an air or gas conducting pipe, a series of injecting devices arranged at intervals in said air pipe, said devices comprising a block having an air passage extending therethrough and with the upper end of which is connected the lower end of the sections of said air pipe, a reduced nipple secured in the lower end of said passage and projecting below the lower end of said blocks, said nipple having a liquid tight sliding engagement with the upper end of the next adjacent air pipe section, an injecting nipple having communication with said air passage in the block and projecting into said oil pipe, whereby the air from said conducting pipe is injected into said oil pipe, and automatically operating means for preventing oil from said oil pipe entering said air pressure pipe.

In testimony whereof I have hereunto affixed my signature.

WILLIAM McCARTY.